US012755115B2

(12) United States Patent
Cheng et al.

(10) Patent No.: US 12,755,115 B2
(45) Date of Patent: Oct. 6, 2026

(54) ELECTRONIC DEVICE WITH HYBRID POWER SOURCE AND METHOD FOR HYBRID POWER SUPPLY

(71) Applicant: Getac Technology Corporation, New Taipei (TW)

(72) Inventors: Hsueh-Mao Cheng, Taipei (TW); Cheng-Han Tsai, Taipei (TW)

(73) Assignee: Getac Technology Corporation, New Taipei (TW)

( * ) Notice: Subject to any disclaimer, the term of this patent is extended or adjusted under 35 U.S.C. 154(b) by 602 days.

(21) Appl. No.: 18/242,596

(22) Filed: Sep. 6, 2023

(65) Prior Publication Data

US 2024/0297507 A1 Sep. 5, 2024

Related U.S. Application Data

(60) Provisional application No. 63/449,272, filed on Mar. 1, 2023.

(51) Int. Cl.
*G06K 7/10* (2006.01)
*G06K 7/14* (2006.01)
(Continued)

(52) U.S. Cl.
CPC ....... *G06K 7/10722* (2013.01); *G06K 7/1413* (2013.01); *H01M 12/02* (2013.01);
(Continued)

(58) Field of Classification Search
CPC ...... H02J 7/50; H02J 7/82; H02J 7/933; H02J 7/54; H02J 7/56; H02J 7/585; H02J 7/80;
(Continued)

(56) References Cited

U.S. PATENT DOCUMENTS 6,268,711 B1 7/2001 Bearfield
7,333,314 B2 2/2008 Yamaji et al.
(Continued)

FOREIGN PATENT DOCUMENTS

CN 110962688 A 4/2020
CN 111959485 A 11/2020
(Continued)

*Primary Examiner* — Nathaniel R Pelton
(74) *Attorney, Agent, or Firm* — Troutman Pepper Locke LLP; Tim Tingkang Xia, Esq.

(57) ABSTRACT

An electronic device with hybrid power source includes a system circuit, a charging and discharging circuit, a power connector, two batteries, and a controller. The charging and discharging circuit is connected to the system circuit, the power connector, and the two batteries. The controller is connected to the processor and the charging and discharging circuit, and the controller has a hybrid power supply mode. The controller detects the operating power of the processor in the system circuit, and controls the power mode from a single power mode to a hybrid power supply mode in response to that the operating power reaches or exceeds the power threshold. In the hybrid power supply mode, under control of the controller, the processor releases a power limit, and the charging and discharging circuit powers the system circuit by using both the battery with greater energy level and an external power.

24 Claims, 7 Drawing Sheets

(51) Int. Cl.

| | |
|---|---|
| ***H01M 12/02*** | (2006.01) |
| ***H01M 50/528*** | (2021.01) |
| ***H02J 7/00*** | (2006.01) |
| ***H02J 7/40*** | (2026.01) |
| ***H02J 7/50*** | (2026.01) |
| ***H02J 7/54*** | (2026.01) |
| ***H02J 7/56*** | (2026.01) |
| ***H02J 7/60*** | (2026.01) |
| ***H02J 7/80*** | (2026.01) |
| ***H02J 7/82*** | (2026.01) |
| ***H02J 7/90*** | (2026.01) |

(52) U.S. Cl.
CPC ........... *H01M 50/528* (2021.01); *H02J 7/445* (2026.01); *H02J 7/50* (2026.01); *H02J 7/54* (2026.01); *H02J 7/56* (2026.01); *H02J 7/585* (2026.01); *H02J 7/60* (2026.01); *H02J 7/80* (2026.01); *H02J 7/82* (2026.01); *H02J 7/865* (2026.01); *H02J 7/933* (2026.01); *H02J 2207/10* (2020.01)

(58) Field of Classification Search
CPC .. H02J 7/865; H02J 7/445; H02J 7/60; G06K 7/10722; H01M 50/528
USPC .......................................................... 320/118
See application file for complete search history.

(56) References Cited

U.S. PATENT DOCUMENTS

| | | | | |
|---|---|---|---|---|
| 11,334,135 | B1 | 5/2022 | Wang et al. | |
| 2006/0075266 | A1 | 4/2006 | Popescu-Stanesti et al. | |
| 2012/0139345 | A1 | 6/2012 | Ye et al. | |
| 2013/0339757 | A1 | 12/2013 | Reddy | |
| 2014/0184143 | A1 | 7/2014 | Coakley et al. | |
| 2014/0281591 | A1 | 9/2014 | Uan-Zo-Li | |
| 2015/0115711 | A1 | 4/2015 | Kouroussis et al. | |
| 2016/0291683 | A1 | 10/2016 | Kacker et al. | |
| 2017/0310138 | A1 | 10/2017 | Masaoka et al. | |
| 2019/0305568 | A1* | 10/2019 | Hand ...................... | H02J 7/865 |
| 2020/0412132 | A1 | 12/2020 | Kristjansson et al. | |
| 2021/0064109 | A1* | 3/2021 | Tandon .................. | G06F 1/263 |
| 2022/0294236 | A1 | 9/2022 | Ha et al. | |

FOREIGN PATENT DOCUMENTS

| | | | |
|---|---|---|---|
| TW | 202115953 | A | 4/2021 |
| TW | 202207574 | A | 2/2022 |

* cited by examiner

ELECTRONIC DEVICE WITH HYBRID POWER SOURCE AND METHOD FOR HYBRID POWER SUPPLY

CROSS-REFERENCE TO RELATED APPLICATION

This application claims the benefit of U.S. provisional application Ser. No. 63/449,272, filed on Mar. 1, 2023. The entirety of the above-mentioned patent application is hereby incorporated by reference herein and made a part of the specification.

BACKGROUND OF THE INVENTION

The present disclosure relates to a power supply technology for an electronic device, and particularly relates to an electronic device with hybrid power source and a hybrid power supply method.

Currently, electronic devices have been experiencing an increase in performance, and thus possessing greater processing capabilities and faster operating speeds. On the other hand, because these electronic devices are operated under high-performance conditions, the power demands of these electronic devices rise. When an electronic device is unable to extract sufficient energy from a single power source or a battery to support high-power operations, the processor can perform frequency reduction to prevent system abnormalities. However, this frequency reduction also results in the decrease in the computer's performance.

SUMMARY OF THE INVENTION

In view of this, the present disclosure provides an electronic device with hybrid power supply and a method for hybrid power supply, which are suitable for supplying power to a system circuit of the electronic device using a combination of power sources, thereby providing sufficient electrical power for high-power operations.

In one embodiment, an electronic device with a hybrid power source comprises a system circuit, a charging and discharging circuit, a power connector, two batteries, and a controller, wherein the system circuit comprises a processor. The charging and discharging circuit is connected to the system circuit. The power connector is connected to the charging and discharging circuit, wherein the power connector is adapted to couple to an external power source. The two batteries are connected to the charging and discharging circuit, wherein each of the batteries has a corresponding one of energy levels. The controller is connected to the processor and the charging and discharging circuit, wherein the controller has a hybrid power scenario. In the hybrid power scenario, the controller detects an operating power of the processor and is switched from a single power supply mode to a hybrid power supply mode in response to that the operating power reaches or exceeds a power threshold. In the hybrid power supply mode, the processor releases a power limit of the operating power, and the charging and discharging circuit supplies power to the system circuit from both the battery having a greater energy level and the external power source at the same time.

In one embodiment, a method for hybrid power supply comprises: monitoring an operating power of a system circuit in a hybrid power scenario; in response to that the operating power reaches or exceeds a power threshold, releasing a power limit of the operating power and supplying power in a hybrid power supply mode, wherein the steps of the hybrid power supply mode include: receiving an external power through an adapter; comparing energy levels of two batteries and assigning a corresponding one of operational roles to each of the two batteries as discharge battery or standby battery based on the energy levels of the two batteries; and supplying power to the system circuit using both the discharge battery and the external power at the same time. In some embodiments, one of the two batteries having a greater energy level is designated as a discharge battery, and the other one of the two batteries having a lower energy level is designated as a standby battery.

DETAILED DESCRIPTION OF THE INVENTION

Figure 1:
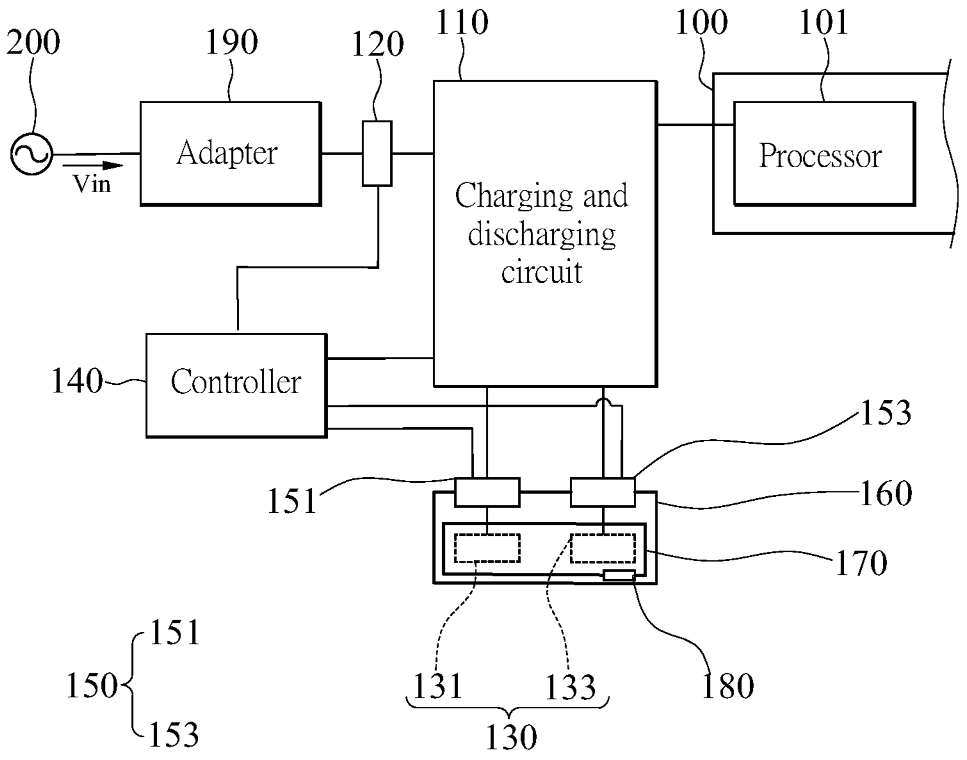
FIG. 1 illustrates a functional block diagram of an electronic device with hybrid power source according to some embodiments.

Please refer to FIG. 1. An electronic device with hybrid power source includes a system circuit 100, a charging and discharging circuit 110, a power connector 120, two batteries 130, and a controller 140. The system circuit 100 comprises a processor 101. The processor 101 operates with an operating power during the operation of the electronic device and has a power threshold. The charging and discharging circuit 110 is connected to the system circuit 100 and the power connector 120. The power connector 120 is adapted to couple to an external power source 200. Specifically, in some embodiments, the electronic device receives power Vin provided by the external power source 200 through the power connector 120. The two batteries 130 are connected to the charging and discharging circuit 110 and both the batteries 130 can storage energy. The controller 140 is connected to the processor 101 and the charging and discharging circuit 110.

Figure 2:
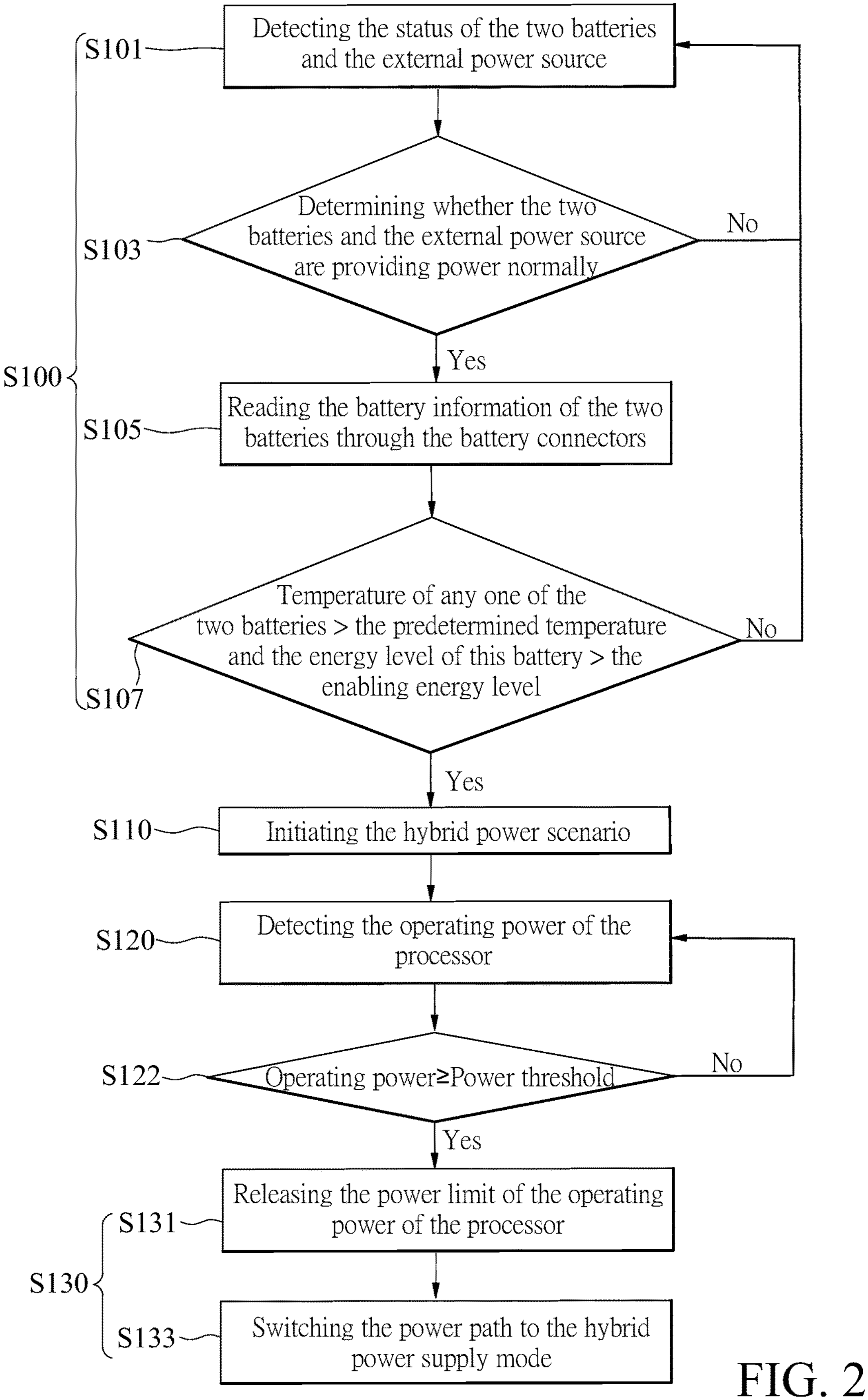
FIG. 2 illustrates a flowchart of a hybrid power supply method according to some embodiments.

Please refer to FIG. 2. The controller 140 has a hybrid power scenario. Initially, the power supply mode of the electronic device is a single power supply mode. After the controller 140 enters the hybrid power scenario (the step S110), the controller 140 detects the operating power of the processor 101 (the step S120).

In the step S120, the controller 140 reads the operating power of the processor 101 and compares the read operating power with a power threshold. In response to that the operating power reaches or exceeds the power threshold (the step S122), the controller 140 switches the power supply mode of the electronic device from the single power supply mode to a hybrid power supply mode (the step S130).

In the step S130, the controller 140 first controls the processor 101 to release the power limit of the operating power of the processor 101 (the step S131) and then controls the charging and discharging circuit 110 to switch the power path to the hybrid power supply mode (the step S133). Furthermore, the controller 140 enables the system circuit 100 to be powered by both the battery 130 with the greater energy level and the external power source 200. Considering the case where the batteries 130 comprise a first battery 131 and a second battery 133, and the energy level of the first battery 131 is greater than the energy level of the second battery 133, in the step S130, the processor 101 releases the power limit, and the charging and discharging circuit 110 provides parallel power supply to the system circuit 100 using the energy stored in the first battery 131 and the power from the external power source 200.

Accordingly, by adopting the hybrid power supply mode under the heavy load conditions (i.e., in response to that the operating power reaches or exceeds the power threshold), instability and potential system crashes of the system circuit 100 caused by insufficient power supply can be avoided, while still maintaining the performance of the processor 101 (e.g., performing the operation of the processor 101 without frequency reduction). Additionally, such configuration also prevents damage to the system circuit 100 caused by power overload, ensuring the stable operation of the electronic device.

In some embodiments, in the single power supply mode, the charging and discharging circuit 110 selects one power source (i.e., batteries 130 or external power source 200) to supply power to the system circuit 100 according to the power source status, voltage level, or priority stage. For example, considering the voltage level as a factor, in response to that the electronic device is equipped with two batteries 130 in parallel coupled to the external power source 200, the charging and discharging circuit 110 supplies power to the system circuit 100 by the source with a higher voltage between the batteries 130 and external power source 200. Additionally, in the single power supply mode, the operating power of the processor 101 is limited by a set power limit to ensure the stability and reliability of the electronic device. In other words, in some embodiments, the processor 101 is set with a power limit to restrict the operation of the processor 101 within a specific power range. For example, when the operating power of the processor 101 reaches the specified power limit condition, such as power limit level 1 (PL1), power limit level 2 (PL2), power limit level 3 (PL3), or power limit level 4 (PL4), the processor 101 automatically reduces the frequency of the processor 101 to lower the power consumption. This power limit setting may be apply, for instance, to Intel's System on a Chip (SoC) processors.

For example, in the single power supply mode, the maximum power limit (i.e., PL4) for the power source is set as 62 watts (W), indicating that the operating power of the processor 101 should not exceed 62 watts. However, when the processor 101 operates using Turbo Boost technology and the hybrid power supply mode is adopted, the operating power of power limit (PL4) can be increased to 121 watts, allowing the system circuit 100 to perform better and handle higher loads. In heavy load scenarios, compared to the existing frequency reduction operation of the processor, adopting the hybrid power supply mode can increase the performance of the processor 101 by 29.45%.

In some embodiments, the power threshold can be determined according to the power peak of the processor 101 at PL4. In an exemplary embodiment, taking the power limit of PL4 being 62 watts as an example, the power threshold can be set as 58 watts.

As shown in FIG. 1 and FIG. 2, in some embodiments, the controller 140 selectively enters the hybrid power scenario (the step S100) according to the battery status of the batteries 130 and the power supply status of the external power source 200. In other words, in some embodiments, the controller 140 determines whether the conditions of power supply are met by evaluating the status of the two batteries 130 and the external power source 200 before the controller 140 determines to initiate the hybrid power scenario.

In some embodiments, the battery status of the batteries 130 refers to whether the batteries 130 are providing power normally, the temperature of the batteries 130, and the energy levels of the batteries 130. The power supply status of the external power source 200 refers to whether the external power source 200 is providing power normally.

In some embodiments, the electronic device may also include two battery connectors 150, and each of the two battery connectors 150 is adapted to be coupled to a corresponding one of the batteries 130. Furthermore, each of the battery connectors 150 is coupled between the corresponding one of the batteries 130 and the charging and discharging circuit 110. In other words, in some embodiments, each of the batteries 130 is electrically connected to the charging and discharging circuit 110 via the corresponding one of the battery connectors 150.

In some embodiments of the step S100, the controller 140 detects the status of the two batteries 130 and the external power source 200 (the step S101) to determine whether the batteries 130 and external power source 200 are providing power normally (the step S103). Specifically, in some embodiments, the controller 140 detects the two battery connectors 150 and the power connector 120 to determine whether the two battery connectors 150 and the power connector 120 are respectively coupled to the batteries 130 and the external power source 200. If the controller 140 detects that the two battery connectors 150 are coupled to the batteries 130 and the power connector 120 is coupled to the adapter 190, the batteries 130 and the external power source 200 are providing power normally.

In some embodiments, in response to that the power connector 120 is coupled to the external power source 200 but only one of the battery connectors 150 is coupled to the corresponding one of the batteries 130 (for example, the first battery 131 is coupled to the first battery connector 151 while the second battery 133 is not coupled to the second battery connector 153), in the step S130, the controller 140 controls the charging and discharging circuit 110 to supply power to the system circuit 100 using the battery 130 coupled to the battery connector 150 and the external power source 200 at the same time. However, since the other battery connector 150 is not coupled to the battery 130, the other battery 130 does not perform charging operations to the electronic device.

In some embodiments, after the controller 140 confirms that the batteries 130 and the external power source 200 are supplying power normally, the controller 140 reads the battery information of the two batteries 130 through the battery connectors 150 (the step S105). The battery information includes the temperatures and the energy levels of the batteries 130. The controller 140 compares the read temperature of each of the batteries 130 with the predetermined temperature (the step S107), and the controller 140 also compares the energy level of each of the batteries 130 with the enabling energy level (the step S107). In response to that the temperature of any one of the two batteries 130 exceeds the predetermined temperature and the energy level of this battery 130 is greater than the enabling energy level, the controller 140 determines that the power supply conditions are met, and the hybrid power scenario can be initiated (the step S110).

In some embodiments, if the batteries 130 and the external power source 200 are supplying power normally, yet the temperature of both the two batteries 130 is not greater than the predetermined temperature or the energy levels of both the two batteries 130 are not greater than the enabling energy level, the controller 140 determines that the power supply conditions are not met, and the hybrid power scenario cannot be initiated.

In some embodiments, during the step S103 and the step S107, if the controller 140 determines that either the batteries 130 or the external power source 200 is unable to supply power normally, or the controller 140 determines that the temperatures of both the two batteries 130 are not greater than the predetermined temperature or the energy levels of the two batteries 130 are not greater than the enabling energy level, the controller 140 can return to the step S101 and repeat the process of the step S100 to determine whether the batteries 130 and the external power source 200 can be detected and initiate the hybrid power scenario in response to that both the batteries 130 and the external power source 200 can supply power normally.

Figure 3:
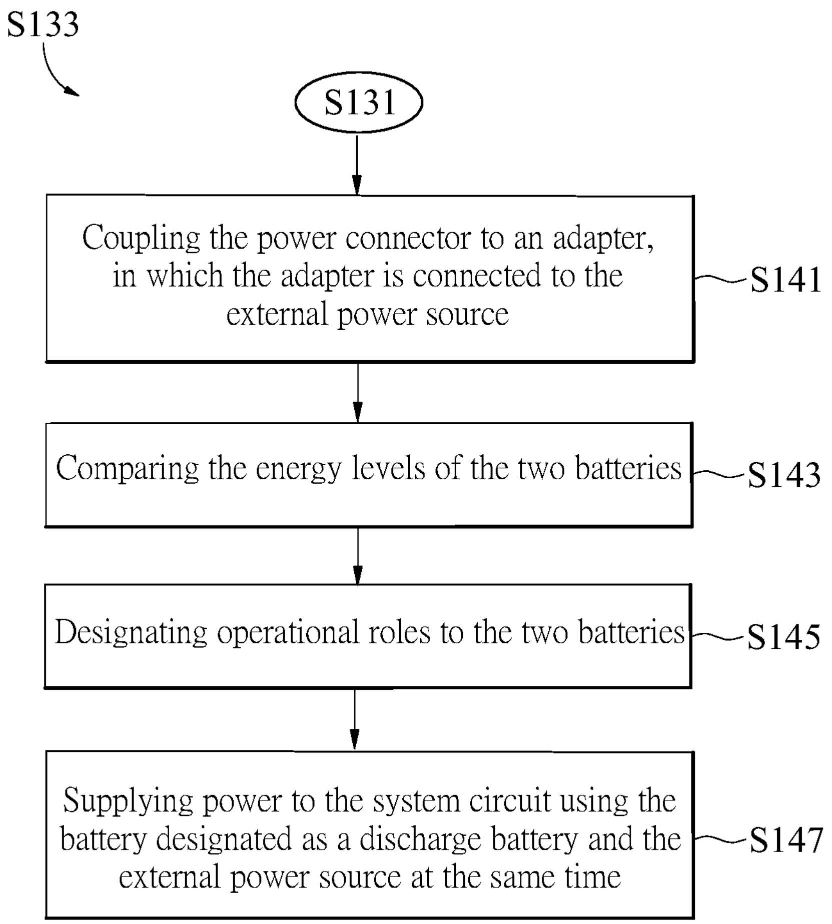
FIG. 3 illustrates a flowchart of an embodiment of the step S133 show in FIG. 2.

Please refer to FIG. 1 and FIG. 3. In some embodiments, the power connector 120 can be coupled to an adapter 190, in which the adapter 190 is further connected to the external power source 200 (the step S141). Therefore, the charging and discharging circuit 110 can receive power from the external power source 200 through the power connector 120.

In some embodiments of the step S133, the controller 140 compares the energy levels of the two batteries 130 obtained from the battery connectors 150 (the step S143). Then, according to the energy levels of the two batteries 130, the controller 140 designates operational roles to the two batteries 130 (the step S145), and the controller 140 controls the charging and discharging circuit 110 to supply power to the system circuit 100 using the battery 130 designated as a discharge battery and the external power source 20 at the same time (the step S147).

For an example, assume that the two batteries 130 are the first battery 131 and the second battery 133, and the energy level of the first battery 131 is greater than that of the second battery 133. Specifically, in this embodiment, the controller 140 designates the first battery 131 which has a greater energy level as the discharge battery, and designates the second battery 133 which has a less energy level as the standby battery (the step S145). The charging and discharging circuit 110 supplies power to the system circuit 100 using the first battery 131 and the external power source 200 at the same time (the step S147).

Figure 4:
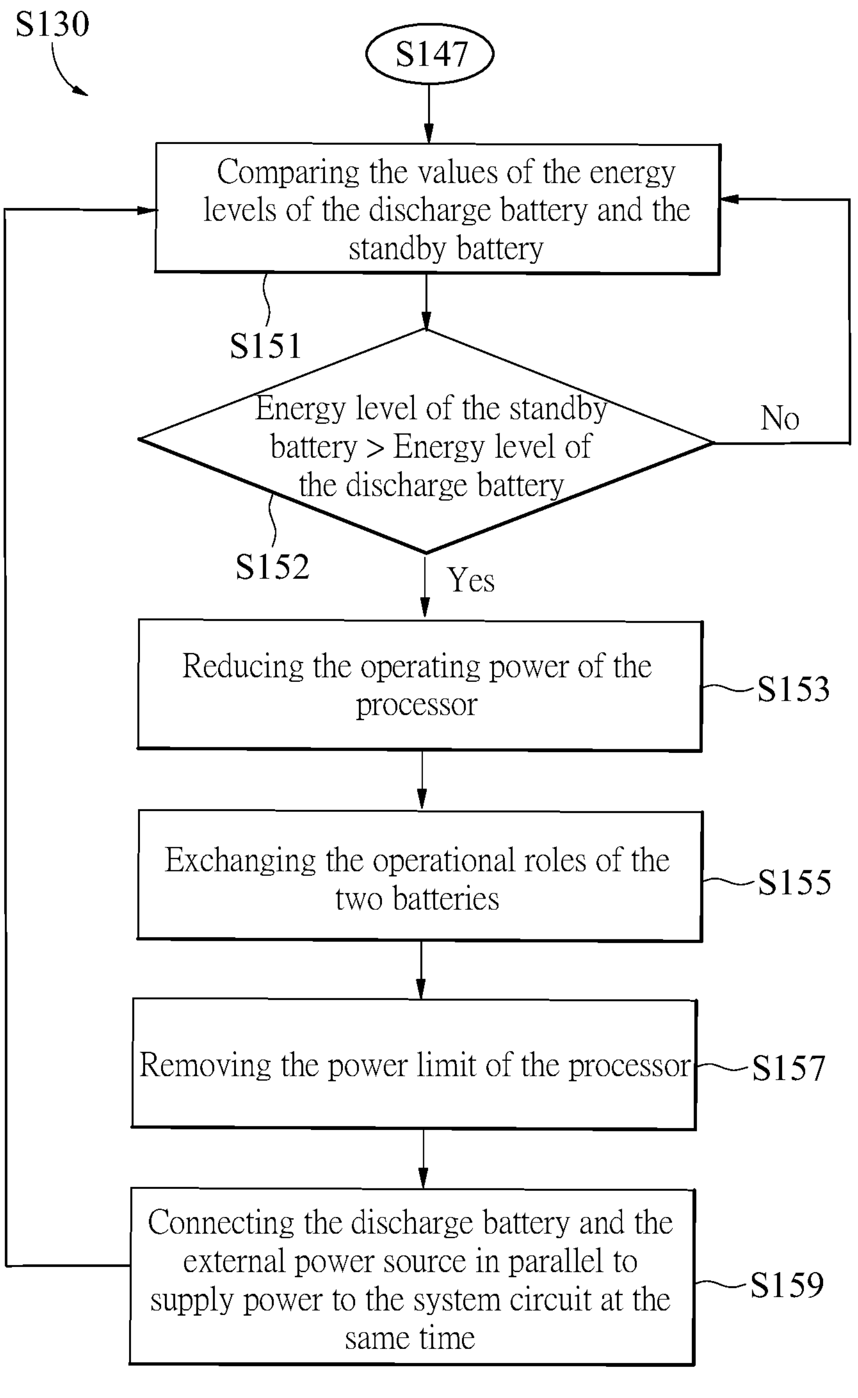
FIG. 4 illustrates a flowchart of an exemplary embodiment of the step S130 shown in FIG. 2, wherein the steps after the step S147 are illustrated.

Please refer to FIG. 1 and FIG. 4. In some embodiments, following the previous example, under the hybrid power supply mode, the energy level of the first battery 131 (currently designated as the discharge battery) will gradually decrease with the increase of the operation time of the system circuit 100, while the energy level of the second battery 133 (currently designated as the standby battery) remains unchanged. Therefore, in the hybrid power supply mode, the controller 140 continuously monitors the energy levels of the two batteries 130 and switches the operational roles of the batteries 130 in response to that the energy levels of the two batteries 130 are reverse (i.e., when the energy level of the second battery 133 is greater than the energy level of the first battery 131).

Specifically, in some embodiments, after the step S147, the controller 140 reads the energy levels of the first battery 131 and the second battery 133 through the battery connectors 150 and compares the values of the energy levels of the two batteries 130 (the step S151). If the energy level of the currently unpowered second battery 133 (i.e., the battery 130 currently designated as the standby battery) is greater than the energy level of the first battery 131, which is currently supplying power to the system circuit 100 along with the external power source 200 (the step S152), the controller 140 controls the processor 101 to reduce the operating power of the processor 101 (the step S153). Then, the controller 140 controls the charging and discharging circuit 110 to exchange the operational roles of the two batteries 130 (the step S155) and then remove the power limit of the processor 101 (the step S157), thereby using the second battery 133 as the discharge battery, which is connected in parallel with the external power source 200 to supply power to the system circuit 100 (the step S159).

On the contrary, when the controller 140 compares the energy level of first battery 131 which is currently powered and the second battery 133 which is currently unpowered and determines that the energy level of the first battery 131 is still greater than the energy level of the second battery 133, the charging and discharging circuit 110 does not exchange the operational roles of the two batteries 130.

In this way, according to some embodiments, the steps S151 to S159 can be executed repeatedly to continuously monitor the energy levels of the two batteries 130 and exchange the operational roles if necessary.

In some embodiments of the step S153, the processor 101 can reduces the operating power of the processor 101 to restrict the operating power of the system circuit 100 to below a certain predetermined power limit. The predetermined power limit can be determined according to the designers' specifications such as PL1, PL2, PL3, or PL4. Therefore, during the role exchange of the two batteries 130, abnormal shutdown of the electronic device caused by excessive operating power of the processor 101 can be prevented.

In addition to controlling the charging and discharging circuit 110 to alternately charging and discharging the two batteries 130, the controller 140 also controls the processor 101 to release the power limit (the step S159). After the step S159, the process returns to execute the step S151 and subsequent steps to continue monitoring the energy levels of the two batteries 130 and exchange the operational roles in response to that the relationship between the energy levels of the batteries 130 is reversed again.

Figure 5:
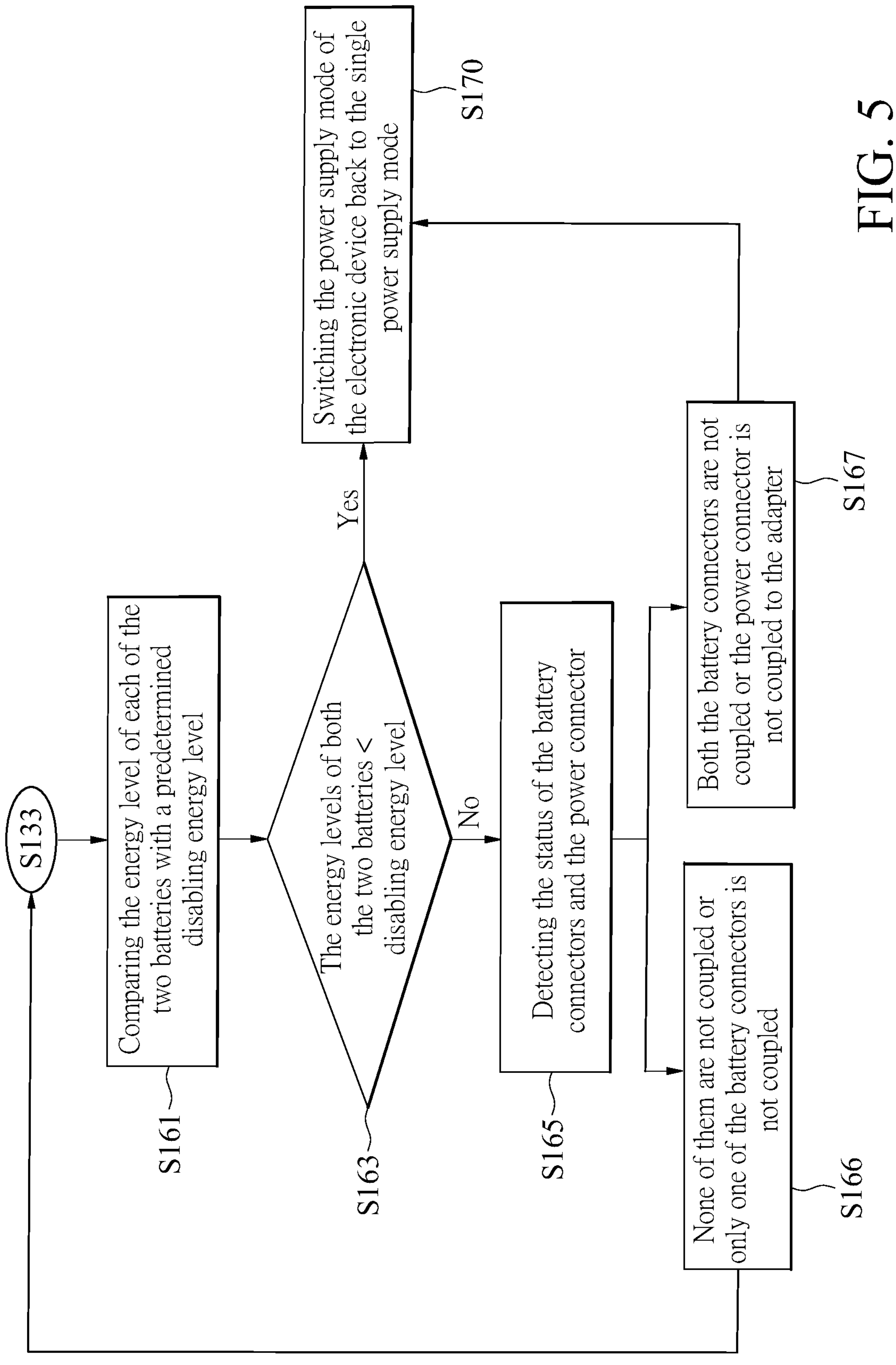
FIG. 5 illustrates a flowchart of an exemplary embodiment of determining whether to execute the step S170 after the step S133 shown in FIG. 2.

Please refer to FIG. 5. In some embodiments, after the electronic device adopts the hybrid power supply mode in step S133, the controller 140 compares the energy level of each of the batteries 130 with a predetermined disabling energy level (the step S161). The disabling energy level is less than the enabling energy level, for example, if the enabling energy level is 15% of the energy level of the battery 130, the disabling energy level would be 10% of the energy level of the battery 130. If the energy levels of both the two batteries 130 are less than the disabling energy level (the step S163), the controller 140 switches back to the single power supply mode from the hybrid power supply mode (the step S170).

Otherwise, the current state that both the two batteries 130 and the external power source 200 supply power to the system circuit 100 at the same time can be maintained. For example, if only one battery 130 has an energy level less than the disabling energy level, or if both batteries 130 have energy levels greater than the disabling energy level, the hybrid power supply mode will continue to be adopted.

In some embodiments, after the controller 140 switches the power supply mode of the electronic device back to the single power supply mode due to the energy levels of the two batteries 130 are less than the disabling energy level, the charging and discharging circuit 110 charges the battery 130 with less energy level as a first priority while the external power source 200 supplies power to the system circuit 100 at the same time.

As shown in FIG. 1 and FIG. 5, in some embodiments, the controller 140 detects the status of the battery connectors 150 and the power connector 120 (the step S165) and determines if the power connector 120 is not coupled to the adapter 190 or if both the battery connectors 150 are not coupled to the batteries 130.

The controller 140 may determine four conditions when assessing the power connector 120 and/or the battery connectors 150 are not coupled. These conditions are as follows: (1) the power connector 120 is not coupled to the adapter 190 (the step S167); (2) both the two battery connectors 150 are not coupled to the two batteries 130 (the step S167); (3) only one of the two battery connectors 150 is not coupled to the corresponding battery 130 (the step S166); (4) none of the two battery connectors 150 or power connector 120 are not coupled (the step S166).

In the case that the power connector 120 is not coupled to the adapter 190, the controller 140 switches the power supply mode of the electronic device back to the single power supply mode to prevent the electronic device from receiving power from external power source 200 (the step S170).

Similarly, in the case that both the two battery connectors 150 are not coupled to the two batteries 130, only the external power source 200 is available to provide power for the electronic device through the power connector 120, the controller 140 also switches the power supply mode back to the single power supply mode (the step S170).

In the case that only one of the two battery connectors 150 (e.g., the first battery connector 151) is not coupled to the corresponding one of the two batteries 130 (e.g., the first battery 131), while the other battery 130 (e.g., the second battery 133) and external power source 200 can still supply power to the system circuit 100 at the same time, the electronic device continues to operate in the hybrid power supply mode. Similarly, if none of the three (the two battery connectors 150 and the power connector 120) are not coupled, the electronic device continues to operate in the hybrid power supply mode.

In some embodiments, the steps S161 to S166 can be repeatedly executed to prevent the electronic device from adopting the hybrid power supply mode upon the power supplied to the system circuit 100 from the batteries 130 and the external power source 200 is insufficient. Otherwise, inadequate power supply to the system circuit 100 may result in overload of the processor 101, leading to abnormal shutdown and other issues for the electronic device.

In some embodiments, both the two batteries 130 in the battery compartment 160 are replaceable or non-replaceable, or only one of the two batteries 130 is be replaceable.

Please refer to FIG. 1 again. In some embodiments, for the case that both the two batteries 130 are replaceable, the electronic device includes a battery compartment 160, a cover 170, and a cover switch 180. The batteries 130 are assembled in the battery compartment 160. The battery connectors 150 may be at the battery compartment 160. When the batteries 130 are correctly installed, the batteries 130 are coupled to the battery connectors 150. The battery compartment 160 has an opening, and the cover 170 is on the battery compartment 160. The cover switch 180 is on the battery compartment 160 and is adapted to fix the cover 170 on the battery compartment 160. In some embodiments, when the cover switch 180 is opened, the cover 170 is unlocked, and the batteries 130 can be removed from the battery compartment 160, allowing the user to replace the batteries 130.

Figure 6:
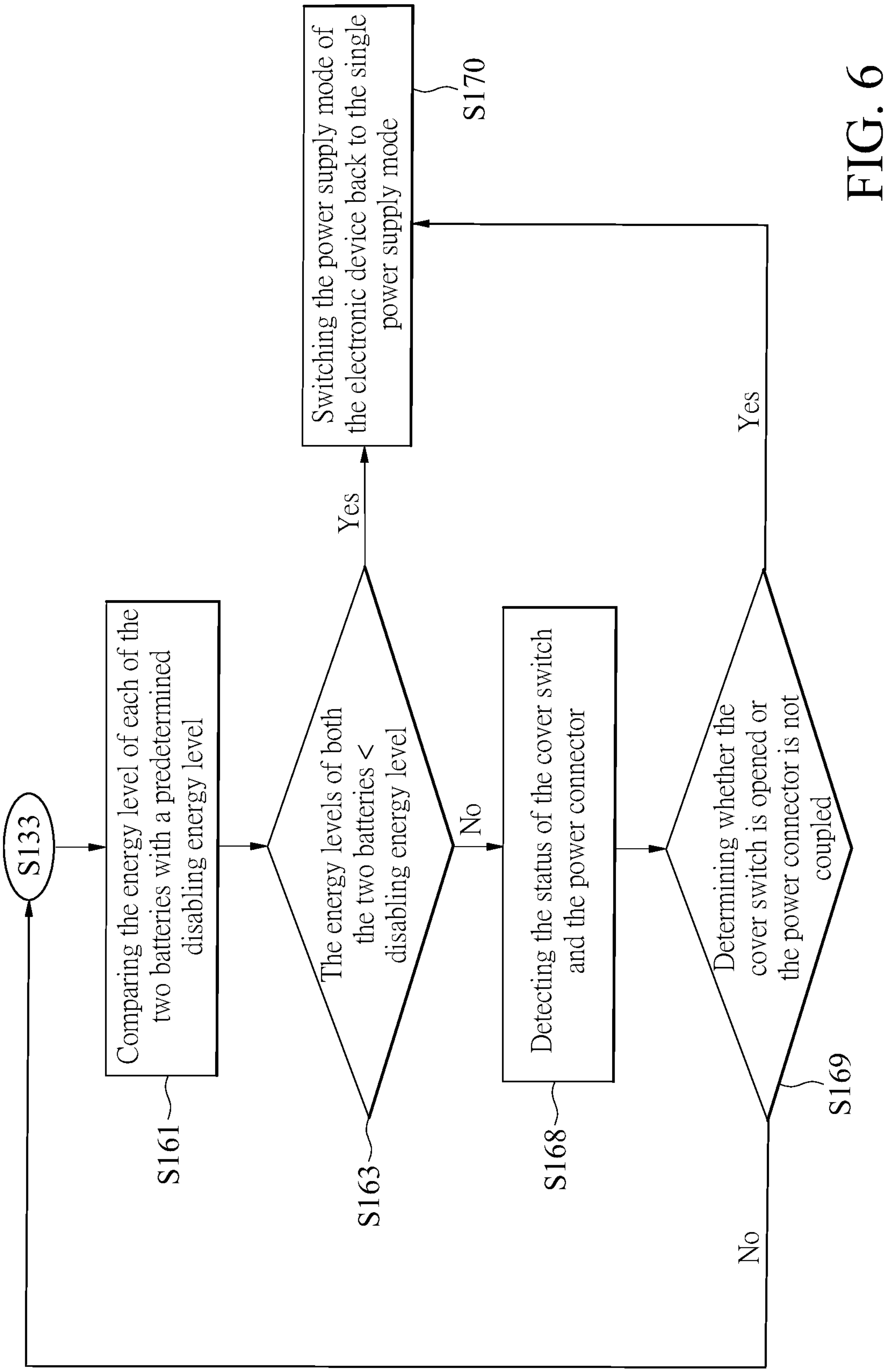
FIG. 6 illustrates a flowchart of another exemplary embodiment of determining whether to execute the step S170 after the step S133 shown in FIG. 2.

Please refer to FIG. 1 and FIG. 6. In some embodiments, after the step S163, the controller 140 detects the status of the cover switch 180 and the power connector 120 (the step S168). The controller 140 takes that the cover switch 180 is opened as a signal that the user intends to replace the batteries 130, and such configuration allows the controller 140 to switch the power supply mode of the electronic device back to the single power supply mode before the batteries 130 are replaced. Therefore, in response to that the controller 140 determines that the cover switch 180 is opened or the power connector 120 is not coupled (the step S169), the controller 140 switches the power supply mode of the electronic device from the hybrid power supply mode back to the single power supply mode (the step S170).

Similarly, in some embodiments, the steps S168 and S169 can be performed at any moment during the process after the hybrid power supply mode is adopted.

In some embodiments of the step S170, in response to that the controller 140 switches the power supply mode of the electronic device back to the single power supply mode, the processor 101 can reduce the operating power of the processor 101 to ensure the stability and reliability of the electronic device. In the single power supply mode, the system circuit 100 can be powered by the external power source 200 or the batteries 130.

Figure 7:
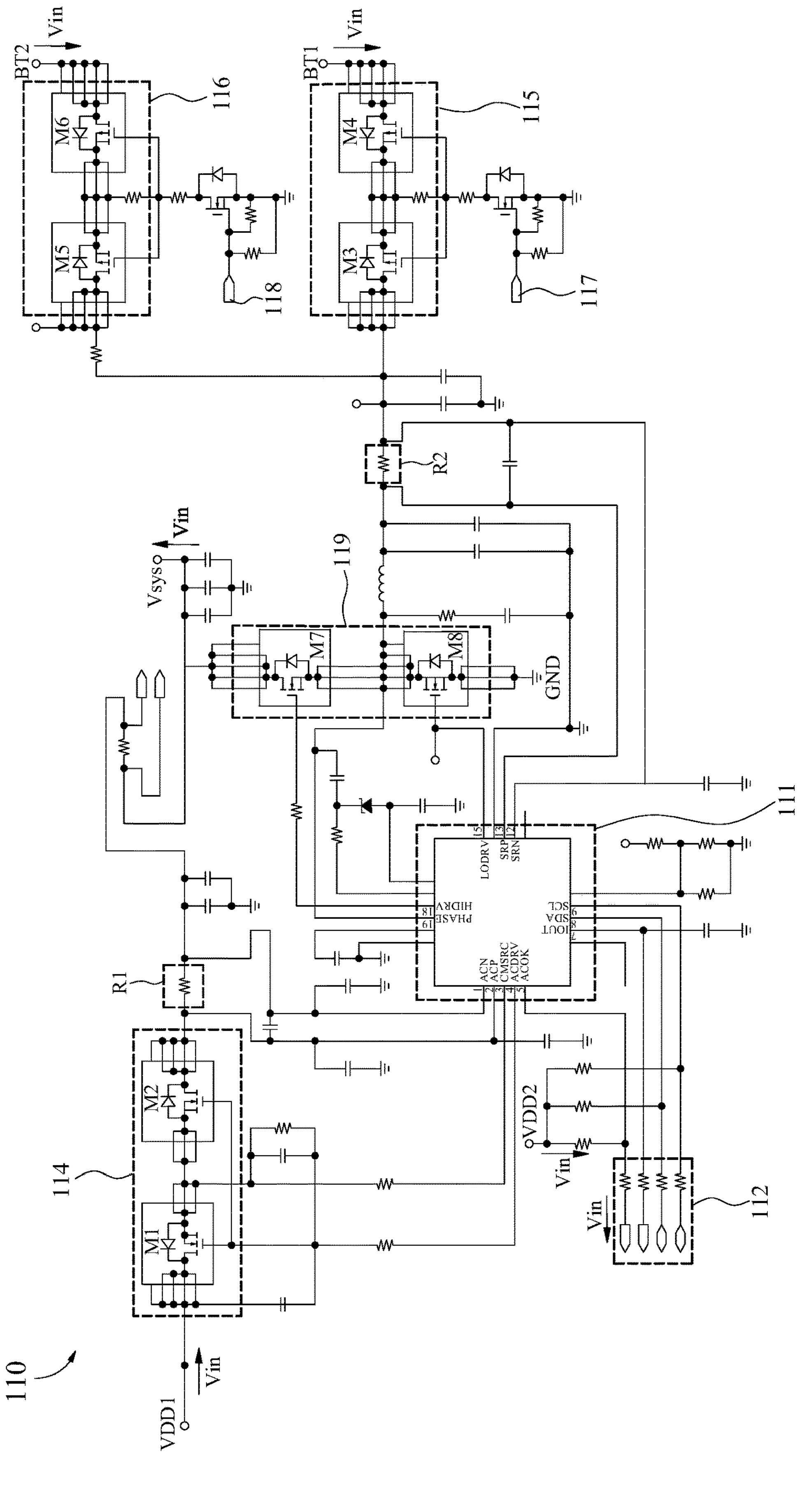
FIG. 7 illustrates a schematic circuitry diagram of an exemplary embodiment of a detailed circuit of the charging and discharging circuit shown in FIG. 1.

Please refer to FIG. 1 and FIG. 7. The charging and discharging circuit 110 receives the power Vin from the external power source 200 via contact points VDD1 and VDD2, and the charging and discharging circuit 110 also receives the power Vin from the batteries 130 via contact points BT1 and BT2. The contact points VDD1 and VDD2 connect the charging and discharging circuit 110 to the external power source 200. The contact point VDD2 is connected to the contact point 112 to supply the power Vin from the external power source 200 to the controller 140, while the power Vin from the external power source 200 and the battery 130 is outputted to the system circuit 100 via the contact point Vsys. Additionally, the charging and discharging circuit 110 is connected to the controller 140 via contact points 112, 117, and 118.

In some embodiments, the charging and discharging circuit 110 may include a charger 111, an input switch 114, a current detector R1, battery switches 115, 116, a current detector R2, and a power supply mode switch 119. The input switch 114, the current detector R1, the battery switches 115, 116, the current detector R2, and the power supply mode switch 119 are connected to the pins of the charger 111.

In some embodiments, the charger 111 has multiple pins, which may include pins ACN, ACP, CMSRC, ACDRV, ACOK, IOUT, SDA, SCL, SRN, SRP, LODRV, HIDRV, PHASE, or the like.

In some embodiments, the input switch 114 includes two transistors M1 and M2 connected in series between the contact point VDD1 and the current detector R1. In the following examples, the transistors M1 and M2 are assumed to be N-type transistors. The gate of transistors M1 and M2 is connected to the pin ACDRV of the charger 111. The pin CMSRC of the charger 111 is connected to the junction between the transistors M1 and M2. The pin ACP of the charger 111 is connected to the junction between the transistor M2 and the current detector R1. The pin ACN of the charger 111 is connected to the current detector R1.

Furthermore, the drain of the transistor M1 receives power from the external power source 200 via the contact point VDD1. The source of the transistor M1 is connected to the source of the transistor M2, and the drain of the transistor M2 is connected to the first terminal of the current detector R1. The second terminal of the current detector R1 is connected to the contact point Vsys. The current detector R1 converts a voltage input from the external power source 200 via the contact point VDD1 into a current and outputs the current to the system circuit 100 via the contact point Vsys.

In some embodiments, in response to that the transistor M2 is conducting, the current can flow from the source of the transistor M2 to the drain of transistor M2, allowing the power Vin to enter the charging and discharging circuit 110.

Please refer to FIG. 7. In some embodiments, the battery switch 115 includes transistors M3 and M4, and the battery switch 116 includes transistors M5 and M6. In the following examples, the transistors M3, M4, M5, and M6 are assumed to be P-type transistors. The pin PHASE of the charger 111 is connected to the junction between the drain of the transistor M3 and the drain of the transistor M5. The source of the transistor M3 is connected to the source of the transistor M4, and the source of the transistor M5 is connected to the source of the transistor M6. The drains of the transistor M4 and the transistor M6 are connected to the contact points BT1 and BT2, respectively, to receive the power Vin from the batteries 130. The junctions of the gates of the transistors M3, M4, M5, and M6 are connected to the controller 140 via the contact points 117 and 118.

The current detector R2 may be connected between the junction of the transistor M3 and the transistor M5 and the pin PHASE of the charger 111. The pin SRP of the charger 111 is connected to the first terminal of the current detector R2, and the pin SRN of the charger 111 is connected to the second terminal of the current detector R2. The current detector R2 is adapted to detect the value of the current from the battery 130 entering the charging and discharging circuit 110, allowing the charger 111 to monitor the current variations during charging and discharging.

In the case where the power Vin from the batteries 130 can be obtained through the contact points BT1 and BT2, the battery switches 115 and 116 receive signals from the controller 140, so that the battery switches 115 and 116 is either conducting or not conducting when the controller 140 adopts the hybrid power supply mode, thereby allowing the power Vin from the battery 130 can enter the charging and discharging circuit 110 to supply power to the system circuit 100.

Based on the foregoing example (where the energy level of the first battery 131 is greater than the energy level of the second battery 133, taking the first battery 131 being the discharge battery and the second battery 133 being the standby battery as an example), let's assume that the power Vin is supplied to the charging and discharging circuit 110 from the first battery 131 through the contact point BT1, and the power Vin is supplied to the charging and discharging circuit 110 from the second battery 133 through contact point BT2. The controller 140 controls the transistor M4 to be conducting through the contact point 117, allowing the power Vin to enter the charging and discharging circuit 110. At the same time, the controller 140 controls the transistor M6 to be not conducting through contact point 118, thus preventing the power Vin from the second battery 133 from entering the charging and discharging circuit 110 and keeping the power Vin from the second battery 133 in standby.

On the contrary, when the operation role of the first battery 131 is the standby battery and the operation role of the second battery 133 is the discharge battery, the controller 140 controls the transistor M6 to be conducting through the contact point 118, thus enabling the power Vin to enter the charging and discharging circuit 110.

In some embodiments, the power supply mode switch 119 includes transistors M7 and M8. In the following examples, the transistors M7 and M8 are assumed to be N-type transistors. The drain of the transistor M7 is connected to the contact point Vsys, the gate of the transistor M7 is connected to the HIDRV pin of the charger 111, and the source of the transistor M7 is connected to the drain of the transistor M8, which is also connected to the current detector R2 and the PHASE pin of the charger 111. The LODRV pin of the charger 111 is connected to the gate of the transistor M8, and the source of the transistor M8 is connected to the ground voltage GND.

In response to that the transistor M7 is conducting, the power Vin from the battery 130 can flow from the source of the transistor M7 to the drain of the transistor M7, allowing the battery 130 to be connected in parallel with the external power source 200 to supply power to system circuit 100. On the other hand, when the controller 140 is in the single power supply mode and the external power source 200 is supplying power Vin to the system circuit 100, the transistor M7 is not conducting.

Through the coordination of the controller 140, the input switch 114, the charger 111, the power supply mode switch 119, and the battery switches 115 and 116, the external power source 200 and one of the batteries 130 can be connected in parallel to supply power to the system circuit 100 in the hybrid power supply mode, and the external power source 200 or the battery 130 can supply power to the system circuit 100 in the single power supply mode.

In some embodiments, the current detectors R1 and R2 in the charging and discharging circuit 110 may be implemented using two resistors, two capacitors, two inductors, two diodes, or any combination thereof.

In some embodiments, the electronic device may be a computing device, such as a desktop computer, a laptop computer, a notebook computer, or a tablet computer.

In some embodiments, the processor 101 may be, but not limited to, a Central Processing Unit (CPU), a System on Chip (SoC), a general-purpose or special-purpose microprocessor, a Digital Signal Processor (DSP), a programmable controller, an Application Specific Integrated Circuit (ASIC), a Programmable Logic Device (PLD), or a combination of these devices.

In some embodiments, the batteries 130 may be of various types, including dry batteries, lithium batteries, nickel-hydrogen batteries, lead-acid batteries, solar batteries, or a combination of known battery types In some embodiments, the enable level may be set as 15% of the total energy level of the battery 130, and the disable level may be set as 10% of the total energy level of the battery 130.

In some embodiments, the predetermined temperature for the batteries 130 is set according to the temperature at which the battery in various types can discharge normally. For example, when lithium batteries are utilized to supply power to the electronic device, the predetermined temperature for the batteries 130 can be set as 0 degrees Celsius to avoid the adverse effects of poor discharge performance at extremely low temperatures on the power supply from the hybrid power source to the electronic device.

In some embodiments, the adapter 190 may be any power adapter that complies with the power bus specifications, such as an AC/DC converter, a switching power supply, a linear power supply, a wireless charging adapter, or a USB-C PD fast charger.

In some embodiments, the charger 111 may be implemented using a single chip, where the chip may be, for example, BQ24735, BQ25792, MAX77829, LTC4015, or other suitable chips.

In some embodiments, the transistors M1, M2, M7, an M8, and the transistors M3, M4, M5, an M6 are implemented using different channel types of transistors. In some embodiments, the transistors M1, M2, M3, M4, M5, M6, M7, an M8 may be realized using N-type transistors, P-type transistors, bipolar junction transistors (BJTs), insulated gate bipolar transistors (IGBTs), or other types of switching devices. For example, the transistors M1, M2, M7, and M8 may be implemented using N-type transistors, while the transistors M3, M4, M5, and M6 may be implemented using P-type transistors.

In conclusion, in some embodiments, electronic devices that adopt the hybrid power supply mode can have sufficient power to support high-power operation.

What is claimed is:

1. An electronic device with a hybrid power source comprising:

a system circuit comprising a processor;

a charging and discharging circuit connected to the system circuit;

a power connector connected to the charging and discharging circuit, wherein the power connector is adapted to couple to an external power source;

two batteries connected to the charging and discharging circuit, wherein each of the batteries has a corresponding one of energy levels; and a controller connected to the processor and the charging and discharging circuit, wherein the controller has a hybrid power scenario;

wherein in the hybrid power scenario, the controller detects an operating power of the processor and is switched from a single power supply mode to a hybrid power supply mode in response to that the operating power reaches or exceeds a power threshold; and wherein in the hybrid power supply mode, the processor releases a power limit of the operating power, and the charging and discharging circuit supplies power to the system circuit from both the battery having a greater energy level and the external power source at the same time.

2. The electronic device with a hybrid power source according to claim 1, wherein the controller selectively enters the hybrid power scenario based on a battery status of the two batteries and a power supply status of the external power source.

3. The electronic device with a hybrid power source according to claim 2, wherein the controller enters the hybrid power scenario in response to that both the two batteries and the external power source are providing power, and in response to that a temperature of any one of the two batteries exceeds a predetermined temperature and the energy level of the said battery is greater than an enabling energy level.

4. The electronic device with a hybrid power source according to claim 3, wherein in the hybrid power scenario, in response to that the energy levels of both the two batteries are less than a disabling energy level, the controller is switched back from the hybrid power supply mode to the single power supply mode, and the enabling energy level is greater than the disabling energy level.

5. The electronic device with a hybrid power source according to claim 4, further comprising two battery connectors connected to the charging and discharging circuit and respectively coupled to the two batteries, wherein the controller is also connected to the power connector and the two battery connectors;

wherein in the hybrid power scenario, the controller further detects a connection status of the two battery connectors and the power connector, and in response to that the power connector is not coupled to an adapter or both of the two battery connectors are not coupled to the two batteries, the controller is switched back from the hybrid power supply mode to the single power supply mode.

6. The electronic device with a hybrid power source according to claim 4, further comprising:

a battery compartment, wherein the two batteries are assembled in the battery compartment;

a cover on an opening of the battery compartment; and a cover switch on the battery compartment to fix the cover on the battery compartment;

wherein in the hybrid power scenario, the controller further detects a switch state of the cover switch and a connection status of the power connector, in response to that the power connector is not coupled to an adapter or the cover switch is opened, the controller is switched back from the hybrid power supply mode to the single power supply mode.

7. The electronic device with a hybrid power source according to claim 4, wherein the enabling energy level is 15% and the disabling energy level is 10%.

8. The electronic device with a hybrid power source according to claim 3, wherein the predetermined temperature is 0° C.

9. The electronic device with a hybrid power source according to claim 1, wherein in the hybrid power scenario, in response to that the energy level of one of the two batteries which is currently in a non-powered state is greater than the energy level of the other battery which is currently in a powered state, the processor reduces the operating power, and the charging and discharging circuit exchanges the discharges between the two batteries.

10. The electronic device with a hybrid power source according to claim 1, wherein in the hybrid power scenario, in response to that the energy levels of both the two batteries are less than a disabling energy level, the controller is switched back from the hybrid power supply mode to the single power supply mode, and the enabling energy level is greater than the disabling energy level.

11. The electronic device with a hybrid power source according to claim 10, further comprising:

two battery connectors connected to the charging and discharging circuit and respectively coupled to the two batteries, wherein the controller is also connected to the power connector and the two battery connectors;

wherein, in the hybrid power scenario, the controller further detects a connection status of the two battery connectors and the power connector, and in response to that the power connector is not coupled to an adapter, or both of the two battery connectors are not coupled to the two batteries, the controller is switched back from the hybrid power supply mode to the single power supply mode.

12. The electronic device with a hybrid power source according to claim 10, further comprising:

a battery compartment, wherein the two batteries are assembled in the battery compartment;

a cover on an opening of the battery compartment; and a cover switch on the battery compartment to fix the cover on the battery compartment;

wherein in the hybrid power scenario, the controller further detects a switch state of the cover switch and a connection status of the power connector, in response to that the power connector is not coupled to an adapter or the cover switch is opened, the controller is switched back from the hybrid power supply mode to the single power supply mode.

13. A method for hybrid power supply comprising:

monitoring an operating power of a system circuit in a hybrid power scenario;

in response to that the operating power reaches or exceeds a power threshold, releasing a power limit of the operating power and supplying power in a hybrid power supply mode, wherein the steps of the hybrid power supply mode include:

receiving an external power through an adapter;

comparing energy levels of two batteries and assigning a corresponding one of operational roles to each of the two batteries based on the energy levels of the two batteries; one of the two batteries having a greater energy level is designated as a discharge battery, and the other one of the two batteries having a lower energy level is designated as a standby battery; and supplying power to the system circuit using both the discharge battery and the external power source at the same time.

14. The method for hybrid power supply according to claim 13, further comprising:

selectively entering the hybrid power scenario based on both a battery status of the two batteries and a power supply status of the external power source.

15. The method for hybrid power supply according to claim 14, wherein the step of selectively entering the hybrid power scenario based on the battery status of the two batteries and the power supply status of the external power source comprises: entering the hybrid power scenario in response to that both the two batteries and the external power source are supplying power, and in response to that a temperature of any one of the two batteries exceeds a predetermined temperature and the energy level of the said battery is greater than an enabling energy level.

16. The method for hybrid power supply according to claim 15, wherein the steps of the hybrid power supply mode further comprise:

comparing the energy levels of the two batteries with a disabling energy level, wherein the enabling energy level is greater than the disabling energy level; and switching back from the hybrid power supply mode to a single power supply mode in response to that the energy levels of both the two batteries are less than the disabling energy level.

17. The method for hybrid power supply according to claim 16, wherein the steps of the hybrid power supply mode further comprise:

detecting connections of two battery connectors and a power connector, wherein the two battery connectors are respectively coupled to the two batteries, and the power connector is coupled to the adapter; and switching back from the hybrid power supply mode to the single power supply mode in response to that the power connector is not coupled to the adapter, or both of the two battery connectors are not coupled to the two batteries.

18. The method for hybrid power supply according to claim 16, wherein the steps of the hybrid power supply mode further comprise:

detecting a cover switch of a battery compartment and a power connector, wherein the two batteries are assembled in the battery compartment, and the power connector is coupled to the adapter; and switching back from the hybrid power supply mode to the single power supply mode in response to that the power connector is not coupled to the adapter or the cover switch is opened.

19. The method for hybrid power supply according to claim 15, wherein the predetermined temperature is 0° C.

20. The method for hybrid power supply according to claim 14, wherein the steps of selectively entering the hybrid power scenario based on both the battery status of the two batteries and the power supply status of the external power source comprise:

detecting two battery connectors and a power connector;

in response to that each of the two battery connectors is coupled to a corresponding one of the two batteries and the power connector is coupled to the adapter, determining whether the external power source and the two batteries meet a power supply condition;

entering the hybrid power scenario in response to that the power supply condition is met; and not entering the hybrid power scenario in response to that the power supply condition is not met;

wherein the steps of determining whether the external power source and the two batteries meet the power supply condition comprise:

confirming whether the power connector receives the external power source;

reading battery information of the two batteries through the two battery connectors, wherein the battery information includes temperatures and the energy levels of the two batteries;

comparing the temperatures of the two batteries with a predetermined temperature;

comparing the energy levels of the two batteries with an enabling energy level;

determining that the power supply condition is met in response to that the power connector receives the external power source and the temperature of any one of the two batteries is greater than a predetermined temperature, and the energy level of the said battery is greater than the enabling energy level; and determining that the power supply condition is not met in response to that the power connector does not receive the external power source, the temperatures of the two batteries are not greater than the predetermined temperature, or the energy levels of the two batteries are not greater than the enabling energy level.

21. The method for hybrid power supply according to claim 13, wherein the steps of the hybrid power supply mode further comprise:

comparing the energy level of the discharge battery with the energy level of the standby battery;

reducing the operating power if the energy level of the standby battery is greater than the discharge battery; and after reducing the operating power, exchanging the corresponding one of the operational roles between the two batteries.

22. The method for hybrid power supply according to claim 13, wherein the steps of the hybrid power supply mode further comprise:

comparing the energy levels of the two batteries with a disabling energy level; and switching back from the hybrid power supply mode to a single power source mode if the energy levels of both the two batteries are less than the disabling energy level.

23. The method for hybrid power supply according to claim 22, wherein the steps of the hybrid power supply mode further comprise:

detecting connections of two battery connectors and a power connector, wherein the two battery connectors are respectively coupled to the two batteries, and the power connector is coupled to the adapter; and switching back from the hybrid power supply mode to the single power supply mode in response to that the power connector is not coupled to the adapter, or both of the two battery connectors are not coupled to the two batteries.

24. The method for hybrid power supply according to claim 22, wherein the steps of the hybrid power supply mode further comprise:

detecting a cover switch of a battery compartment and a power connector, wherein the two batteries are assembled in the battery compartment, and the power connector is coupled to the adapter; and switching back from the hybrid power supply mode to the single power supply mode in response to that the power connector is not coupled to the adapter or the cover switch is opened.

* * * * *